(12) United States Patent
Tanaka

(10) Patent No.: US 11,750,761 B2
(45) Date of Patent: Sep. 5, 2023

(54) IMAGE READING APPARATUS WITH CORRECTION FOR STREAK IMAGES OUTSIDE OF AREAS HAVING PRINTED CONTENT

(71) Applicant: CANON KABUSHIKI KAISHA, Tokyo (JP)

(72) Inventor: Shigeto Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,541

(22) Filed: Feb. 16, 2022

(65) Prior Publication Data
US 2022/0272228 A1    Aug. 25, 2022

(30) Foreign Application Priority Data
Feb. 25, 2021  (JP) .................. 2021-028650

(51) Int. Cl.
  *H04N 1/409*    (2006.01)
  *H04N 1/00*    (2006.01)
(52) U.S. Cl.
  CPC ......... *H04N 1/409* (2013.01); *H04N 1/00822* (2013.01)
(58) Field of Classification Search
  None
  See application file for complete search history.

(56) References Cited

U.S. PATENT DOCUMENTS

| | | | |
|---|---|---|---|
| 7,253,932 B2 * | 8/2007 | Tsutsumi | H04N 1/00002 358/448 |
| 8,508,803 B2 * | 8/2013 | Hayashi | H04N 1/4097 358/453 |
| 8,548,204 B2 * | 10/2013 | Ikubo | G06V 10/98 358/453 |
| 9,313,353 B2 * | 4/2016 | Depalov | H04N 1/00909 |
| 10,129,415 B2 * | 11/2018 | Morikawa | H04N 1/193 |
| 10,356,252 B2 * | 7/2019 | Koyama | H04N 1/401 |
| 10,356,269 B2 | 7/2019 | Shimizu | H04N 1/00708 |
| 10,616,428 B2 | 4/2020 | Shimizu | H04N 1/00005 |

(Continued)

FOREIGN PATENT DOCUMENTS

JP    2001-285595    10/2001

OTHER PUBLICATIONS

U.S. Appl. No. 17/673,505, filed Feb. 16, 2022.
U.S. Appl. No. 17/681,643, filed Feb. 25, 2022.

*Primary Examiner* — Andrew H Lam
(74) *Attorney, Agent, or Firm* — Venable LLP

(57) ABSTRACT

An image reading apparatus includes: a conveyance unit configured to convey the original; an image reading unit configured to read an image of the original conveyed by the conveyance unit by using a reading sensor to generate image data which represents a reading result; at least one processor configured to: detect a streak image in an image represented by the image data based on the image data; determine a content area in the image represented by the image data, the content area being an area where content is printed, and perform correction processing for removing the streak image by correcting the image data; wherein the at least one processor is configured to be operable in a first reading mode in which the correction processing is performed to image data corresponding to the streak image in an area outside the content area.

9 Claims, 14 Drawing Sheets

(56) References Cited

U.S. PATENT DOCUMENTS

| | | | |
|---|---|---|---|
| 10,764,461 B2 | 9/2020 | Shimizu | H04N 1/00771 |
| 10,897,552 B2 | 1/2021 | Shimizu | H04N 1/00713 |
| 11,172,089 B2 | 11/2021 | Shimizu | H04N 1/00713 |
| 2015/0022864 A1* | 1/2015 | Song | G06T 7/0002 |
| | | | 358/3.26 |
| 2017/0180580 A1* | 6/2017 | Tanaka | H04N 1/00909 |
| 2018/0176400 A1 | 6/2018 | Shimizu | H04N 1/00737 |
| 2022/0272228 A1* | 8/2022 | Tanaka | H04N 1/00822 |
| 2022/0294925 A1* | 9/2022 | Matsumura | G06V 30/162 |

* cited by examiner

FIG. 8A

| 150 | 200 | 200 | 200 | 200 | 200 | 200 | 200 | 200 | 200 |
|---|---|---|---|---|---|---|---|---|---|
| 200 | 150 | 200 | 200 | 200 | 200 | 200 | 200 | 200 | 200 |
| 200 | 200 | 150 | 200 | 200 | 200 | 200 | 200 | 200 | 200 |
| 200 | 200 | 200 | 150 | 200 | 200 | 190 | 200 | 200 | 200 |
| 200 | 200 | 200 | 200 | 150 | 200 | 200 | 200 | 200 | 200 |
| 200 | 200 | 200 | 200 | 200 | 150 | 200 | 200 | 200 | 200 |
| 200 | 200 | 200 | 190 | 200 | 200 | 150 | 200 | 200 | 200 |
| 200 | 200 | 200 | 200 | 200 | 200 | 200 | 150 | 200 | 200 |
| 200 | 200 | 200 | 200 | 200 | 200 | 200 | 200 | 150 | 200 |
| 200 | 200 | 200 | 200 | 200 | 200 | 200 | 200 | 200 | 150 |

FIG. 8B

| 1 | 0 | 1 | 0 | 1 |
|---|---|---|---|---|
| 0 | 0 | 0 | 0 | 0 |
| 1 | 0 | −8 | 0 | 1 |
| 0 | 0 | 0 | 0 | 0 |
| 1 | 0 | 1 | 0 | 1 |

FIG. 8C

| 255 | 0 | 0 | 0 | 0 | 0 |
|---|---|---|---|---|---|
| 0 | 255 | 0 | 0 | 80 | 0 |
| 0 | 0 | 255 | 0 | 0 | 0 |
| 0 | 0 | 0 | 255 | 0 | 0 |
| 0 | 80 | 0 | 0 | 255 | 0 |
| 0 | 0 | 0 | 0 | 0 | 255 |

| Area 00 | Area 01 | Area 02 | Area 03 | ... | Area 0X |
|---|---|---|---|---|---|
| Area 10 | Area 11 | Area 12 | Area 13 | | Area 1X |
| Area 20 | Area 21 | Area 22 | Area 23 | | Area 2X |
| Area 30 | Area 31 | Area 32 | Area 33 | | Area 3X |
| Area 40 | Area 41 | Area 42 | Area 43 | | Area 4X |
| Area 50 | Area 51 | Area 52 | Area 53 | | Area 5X |
| ... | | | | ... | ... |
| Area Y0 | Area Y1 | Area Y2 | Area Y3 | ... | Area YX |

| 0 | 0 | 0 | 0 | ... | 0 |
|---|---|---|---|---|---|
| 0 | 1 | 1 | 0 | | 0 |
| 0 | 1 | 1 | 0 | | 0 |
| 0 | 0 | 0 | 0 | | 0 |
| 0 | 0 | 0 | 0 | | 0 |
| 0 | 0 | 0 | 0 | | 0 |
| ... | | | | ... | ... |
| 0 | | | | ... | 0 |

IMAGE READING APPARATUS WITH CORRECTION FOR STREAK IMAGES OUTSIDE OF AREAS HAVING PRINTED CONTENT

BACKGROUND OF THE INVENTION

Field of the Invention

The present disclosure relates to an image forming apparatus to read an image from an original.

Description of the Related Art

In recent years, it has been promoted to electronically store an accounting document. Thus, demands for a multifunction apparatus having an image reading apparatus to electronically store paper originals are increasing. The image reading apparatus may include a reading mode for reading a specific original, such as a form. In the reading mode for the specific original, the image reading apparatus automatically detects content (character information) from reading data, which is obtained by reading the original, using an OCR (Optical Character Recognition). As a result, the image reading apparatus can electronically store the original with the character information printed on the original as well as the image. In this way, the image reading apparatus facilitates the electronical storing of the accounting document. When electronically storing a paper document, in addition to automatic recognition using the OCR, it is necessary to ensure that the user can recognize small size characters from the read image.

In a case where an automatic document feeder (hereinafter referred to as "ADF") is used, the readability of characters may decrease due to the following phenomena. For example, when the original is conveyed by the ADF, adhering substances such as dust and paper dust may adhere to a platen provided at a reading position of the original. This causes a vertical streak to occur in a read image (hereinafter referred to as "the streak image"). Japanese Patent Application Laid-open No. 2001-285595 discloses an image processing apparatus having a streak image correction function for erasing the streak image.

In Japanese Patent Application Laid-Open No. 2001-285595, when characters overlap with the streak image in the area of the content to be read, by erasing the streak image, a part of the content is also deleted accordingly. This causes a decrease in the accuracy of character detection using the OCR and a decrease in the readability of small size characters.

In the specific original reading mode, in a case where the content is unclear, the characters originally printed on the original may not be read from the read image, therefore, it may not be possible to achieve the purpose of Japanese Patent Application Laid-Open No. 2001-285595, i.e., electronically storing the original. The content that is often included in the accounting document includes, for example, highly important characters such as billing amount, company name, and issue date.

Therefore, erasure of the content and the deterioration of readability due to the streak image may cause serious problems. On the other hand, if the streak image is not erased, it remains in the image. That is, the streak image remains outside the content area (for example, a blank area), and the appearance of the reading image deteriorates. In view of the above-mentioned problems, the present disclosure provides the image reading apparatus that appropriately corrects the streak image caused by the adhering substance adhering to the reading position.

SUMMARY OF THE INVENTION

An image reading apparatus according to one embodiment of the present disclosure includes: a conveyance unit configured to convey the original; an image reading unit configured to read an image of the original conveyed by the conveyance unit by using a reading sensor to generate image data which represents a reading result; at least one processor configured to: detect a streak image in an image represented by the image data based on the image data; determine a content area in the image represented by the image data, the content area being an area where content is printed, and perform correction processing for removing the streak image by correcting the image data; wherein the at least one processor is configured to be operable in a first reading mode in which: the correction processing is performed to image data corresponding to the streak image in an area outside the content area in the image represented by the image data; and the correction processing is not performed to image data corresponding to the streak image in the content area in the image represented by the image data.

An image reading apparatus according to the another embodiment of the present disclosure includes: a conveyance unit configured to convey an original; an image reading unit configured to read an image of the original conveyed by the conveyance unit by using a reading sensor to generate image data which represents a reading result representing a result of reading the original by the image reading unit; at least one processor configured to: detect a streak image in an image represented by the image data based on the image data; determine a content area in the image represented by the image data, the content area being an area where content is printed, and perform correction processing for removing the streak image by correcting the image data; wherein the at least one processor is configured to be operable in a first reading mode in which: the correction processing is performed to image data corresponding to the streak image in the image represented by the image data; and an image in which an image of the content area is added to an image to which the correction processing has performed is output.

Further features of the present invention will become apparent from the following description of exemplary embodiments (with reference to the attached drawings).

BRIEF DESCRIPTION OF THE DRAWINGS

FIG. 8A, FIG. 8B, and FIG. 8C are explanatory views of edge enhancement processing.

FIG. 9A, FIG. 9B, and FIG. 9C are explanatory views of processing of an isolated amount calculation unit and a halftone dot determination unit.

FIG. 10A, FIG. 10B, and FIG. 10C are explanatory views of block selection processing.

FIG. 12A, FIG. 12B, and FIG. 12C are explanatory views of the streak image correction for an accounting document.

DESCRIPTION OF THE EMBODIMENTS

Hereinafter, embodiments for carrying out the present invention will be described with reference to the drawings.

First Embodiment

Figure 1:
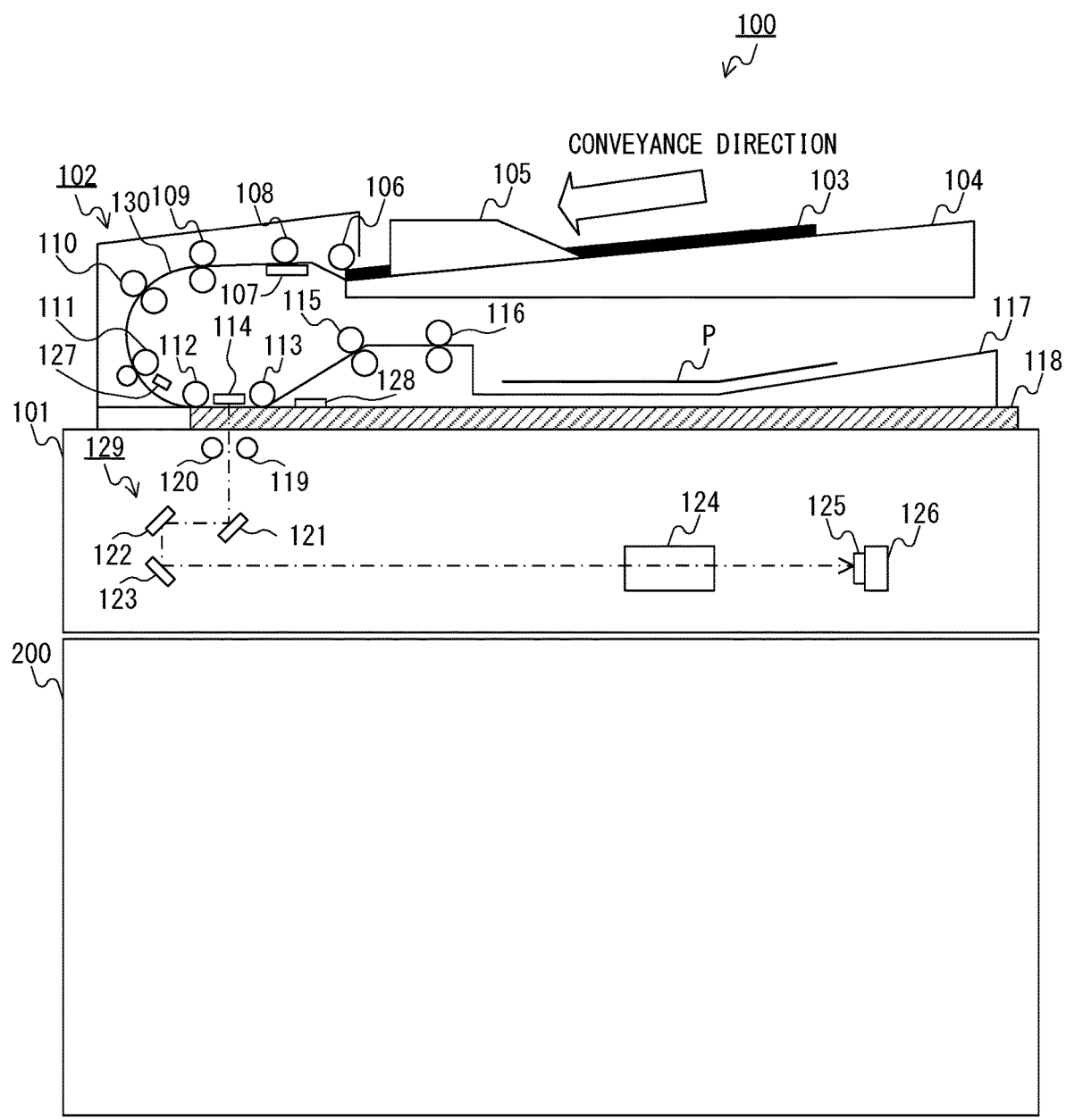
FIG. 1 is a configuration view of an image reading apparatus.

FIG. 1 is a configuration explanatory view of an image reading apparatus of the present embodiment. The image reading apparatus 100 includes an image reading unit 101 and an ADF 102. The image reading apparatus 100 is provided on a printer 200 to print an image on a sheet. The image reading apparatus 100 forms a part of an image forming apparatus 1, such as a copier or a multifunction apparatus, which forms an image on a sheet. The ADF 102 is arranged on an upper part of the image reading unit 101. A platen 118 is provided on an upper surface of the image reading unit 101. The ADF 102 is provided to be openable and closable with respect to the image reading unit 101.

The ADF 102 includes an original tray 104 on which an original bundle 103, which consists of one or more original Ps, is placed, a conveyance path 130, and a discharge tray 117. The original P is conveyed one by one from the original tray 104 to the conveyance path 130, and is discharged to the discharge tray 117. The original P is read by the image reading unit 101 while it is conveyed along the conveyance path 130. In the original tray 104, a pair of width regulating plates 105 are provided at both ends in a direction (width direction) orthogonal to a conveyance direction of the original P. A pair of width regulating plates 105 regulates ends of the width direction of the original bundle 103. At a base end of the original tray 104, a pickup roller 106 for feeding the original P from the original bundle 103 to the conveyance path 130 is arranged.

A separation roller 108 and a separation pad 107 are provided along the conveyance path 130 on a downstream side of the conveyance direction of the original P with respect to the pickup roller 106. The separation roller 108 and the separation pad 107 are arranged to face each other across the conveyance path 130. The separation roller 108 cooperates with the separation pad 107 to separate the original P fed from the original tray 104, from the top of the original bundle 103, to the conveyance path 130 by the pickup roller 106 one by one.

Along the conveyance path 130 on the downstream side of the conveyance direction of the original P with respect to the separation roller 108, first and second registration rollers 109 and 110, first to fourth conveyance rollers 111, 112, 113, and 115, and a discharge roller 116 are arranged. An original detection sensor 127 is arranged between the first conveyance roller 111 and the second conveyance roller 112. The details of the original detection sensor 127 will be described later. The second conveyance roller 112 and the third conveyance roller 113 are positioned such that a space between them is positioned above an upper surface of the platen 118 of the image reading unit 101. The space is a reading position of the image reading unit 101. A white guide member 114 is arranged at a position facing the platen 118 across the conveyance path 130.

The platen 118 of the image reading unit 101 is provided with a shading reference plate 128 at a position adjacent to the reading position via the third conveyance roller 113. A reading unit 129 is provided in a housing of the image reading unit 101. The reading unit 129 includes lamps 119 and 120 as light sources, reflection mirrors 121, 122, and 123, an imaging lens 124, and a line sensor 125. The reflection mirrors 122 and 123 are arranged to face the reflection mirror 121. The imaging lens 124 and the line sensor 125 are arranged to face the reflection mirrors 122 and 123. A signal processing board 126 is electrically connected to the line sensor 125.

In the image reading apparatus 100 having the above configuration, the original bundle 103 placed on the original tray 104 of the ADF 102 is regulated in the width direction by the width regulating plate 105 to thereby prevent the original P from being conveyed diagonally. The pickup roller 106 picks up the original P from the original bundle 103 to feed it to the conveyance path 130. The separation pad 107 and the separation roller 108 cooperate to separate and convey the original P one by one from the top of the original bundle 103.

The first registration roller 109 corrects the skew of the original P, which is separated into one and is conveyed by the separation roller 108. The original P to which the skew correction has been performed is conveyed to the reading position by the second registration roller 110, the first conveyance roller 111, and the second conveyance roller 112. The original P is conveyed between the platen 118 and the white guide member 114 at the reading position. The white guide member 114 presses the original P toward the platen 118 so that the original P passes through the ADF reading position while maintaining contact with the platen 118. Further, the white guide member 114 is read by the reading unit 129 when the original P is not present at the reading position. Based on the reading result of reading the white guide member 114, it is determined whether or not there is an adhering substance such as dust or the like at the reading position.

The reading unit 129 performs a reading operation for the original P passing through the reading position as follows. Start timing of the reading operation of the original P by the reading unit 129 is controlled according to the detection timing of the original P along the conveyance path 130 by the original detection sensor 127.

The lamps 119 and 120 of the reading unit 129 irradiate the original P passing through the reading position with light. The reflection mirrors 121, 122, and 123 reflect the light reflected by the original P toward the imaging lens 124. The imaging lens 124 forms an image of the reflected light on a light receiving surface of the line sensor 125. the line sensor 125 is equipped with two or more image pickup elements, such as a CCD sensor and a CMOS sensor. A reflected light forms an image on a light receiving surface of the image pickup element. The line sensor 125 converts the received reflected light into an electric signal and transmits it to the signal processing board 126. The direction in which the plurality of image pickup elements are arranged is a main scanning direction and is orthogonal to the conveyance direction of the original P. The conveyance direction of the original P is the sub-scanning direction.

The signal processing board 126 performs predetermined processing on the electrical signal obtained from the line sensor 125 and generates image data, which is a reading result of the original P. The image data is a digital signal. The image data is transmitted to a printer 200 from the image reading apparatus 100. In the case of a copy process, the printer 200 forms an image on the sheet based on the image data. When recognizing the content (character information) of the original P, character recognition processing by OCR is performed based on the image data. In a case where the original P is an accounting document, the result of character recognition by OCR and the image data are electronically stored.

The original P to which reading processing is performed at the reading position is conveyed to the third conveyance roller 113 by the second conveyance roller 112. The original P is conveyed through the third conveyance roller 113, the fourth conveyance roller 115, and the discharge roller 116 in this order, and the original P is discharged to the discharge tray 117.

The shading reference plate 128 provided on the platen 118 is read by the reading unit 129 at the time of shading correction. Manufacturing variations occur in the line sensor for each image pickup element (for each pixel). Further, it is not easy to emit the irradiation light uniformly in the main scanning direction from the lamps 119 and 120. Therefore, even in a case where an image is read from the original P on which an image has been formed with a uniform image density, the digital value of the image data, which is a reading result, may vary depending on a position in the main scanning direction.

Shading correction is performed to suppress such variations. Specifically, the reading unit 129 reads the shading reference plate 128. From a reading result of the shading reference plate 128, a correction value is calculated so that the reading result (for example, a luminance value) in the main scanning direction becomes the same predetermined value. With this correction value, the irradiation amounts of the lamps 119 and 120, the sensitivity variation of the image pickup element, or the reading result of the image of the original P is corrected, thus, the variation in the image data for each position in the main scanning direction is corrected.

In order to read the shading reference plate 128, the lamps 119 and 120, and the reflection mirror 121 of the reading unit 129 are configured to be movable in the left and right directions (the sub-scanning direction) in the figure. When reading the shading reference plate 128, the lamps 119 and 120 and the reflection mirror 121 move directly under the shading reference plate 128 from the reading position of the original. When reading the image of the original P after the shading correction, the lamps 119 and 120 and the reflection mirror 121 move to the reading position. The reading unit 129 can also read an image of the original which is manually placed on the platen 118 by the user. In this case, the lamps 119 and 120 of the reading unit 129 and the reflection mirror 121 read the original line by line while moving in the sub-scanning direction.

Figure 2:
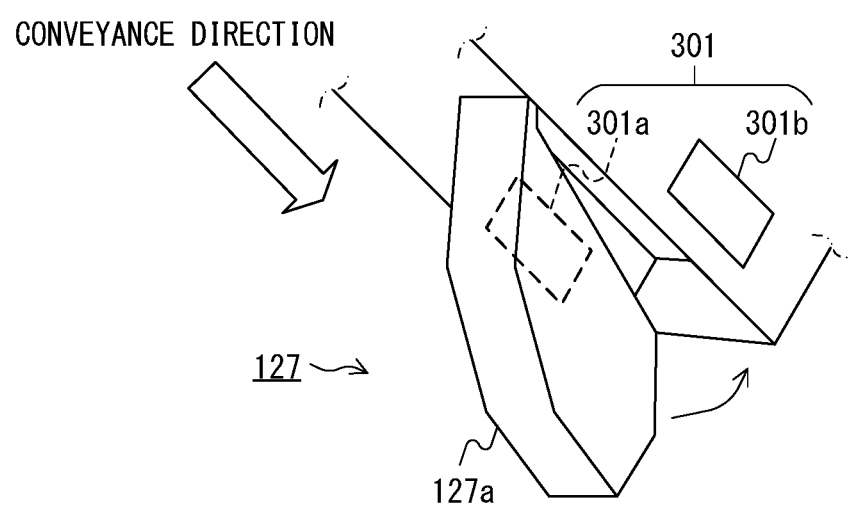
FIG. 2 is an explanatory view of an original detection sensor.

FIG. 2 is an exemplary view of the original detection sensor 127. The original detection sensor 127 includes an actuator 127*a* and a transmissive sensor 301. The transmissive sensor 301 includes an irradiation unit 301*a* and a light receiving unit 301*b*.

The actuator 127*a* collapses in the conveyance direction of the original P when the original P is conveyed along the conveyance path 130 to thereby collide against the actuator 127*a*. The actuator 127*a* blocks, by collapsing in the conveyance direction of the original P, an optical path between the irradiation unit 301*a* and the light receiving unit 301*b* of the transmissive sensor 301. By blocking the optical path between the irradiation unit 301*a* and the light receiving unit 301*b*, (for example, the amount of infrared light) the amount of light received by the light receiving unit 301*b* from the irradiation unit 301*a* will be changed. The amount of light received by the light receiving unit 301*b* is converted into an electrical signal. The change in the amount of light received by the light receiving unit 301*b* corresponds to a change in the level of the electrical signal. From the change of the electrical signal level, it is detected that the original P has reached a detection position of the original detection sensor 127.

<Controller>

Figure 3:
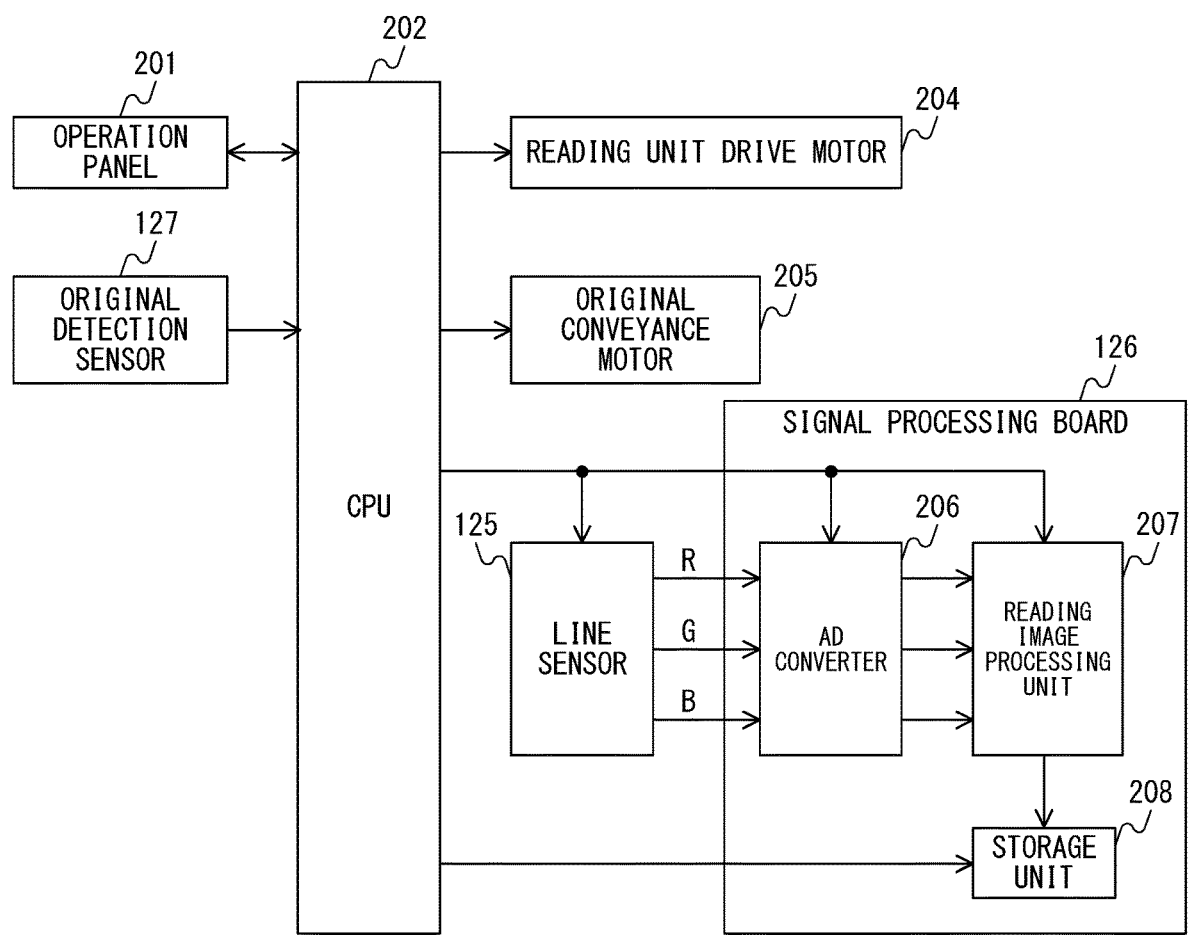
FIG. 3 is an exemplary view of a controller.

FIG. 3 is an explanatory view of a controller which controls an operation of the image reading apparatus 100. The controller is built in the image reading apparatus 100. In the present embodiment, the controller is comprised of a CPU (Central Processing Unit) 202, however, a semiconductor device such as an MPU or an ASIC may be used. The CPU 202 controls the whole operation of the image reading apparatus 100 by executing a predetermined computer program.

The CPU 202 is in connection with an operation panel 201, the original detection sensor 127, a reading unit drive motor 204, an original conveyance motor 205, the line sensor 125, an AD converter 206, a reading image processing unit 207, and a storage unit 208. The AD converter 206, the reading image processing unit 207, and the storage unit 208 are mounted on the signal processing board 126.

As described above, the original detection sensor 127 is provided to an upstream side of the conveyance direction of the original P by a predetermined distance from the reading position of the original P. The CPU 202 determines that a leading edge of the original P has reached the detection position of the original detection sensor 127 based on the change in the level of the electric signal output from the original detection sensor 127, as described above. The CPU 202 manages a timing at which the original P reaches the reading position by the number of pulses for driving the original conveyance motor 205 after the leading edge of the original P reaches the detection position of the original detection sensor 127. At the timing at which the original P reaches the reading position, the line sensor 125 controls the line sensor 125 to activate the reading of the image. This allows the reading of the original P.

Similarly, the CPU 202 determines that a rear end of the original P has reached the detection position of the original detection sensor 127 based on the change in the level of the electric signal output from the original detection sensor 127. The CPU 202 manages a timing at which the original P reaches the reading position by the number of pulses for driving the original conveyance motor 205 after the trailing edge of the original P passes the detection position of the original detection sensor 127. At the timing at which the original P passes the reading position, the line sensor 125 controls the line sensor 125 to finish reading the image. Thus, the reading of the original P is completed.

The operation panel 201 is a user interface including an input interface and an output interface. The input interface includes key buttons, a touch panel, and the like. The output interface includes a display, a speaker, and the like. The CPU 202 controls the operation of the image reading apparatus 100 in response to an instruction or the like input from the input interface of the operation panel 201. The CPU 202 outputs information such as the status of the image reading apparatus 100 from the output interface of the operation panel 201. Further, the CPU 202 displays the setting screen on the display when setting the reading conditions and the like to thereby accept the operation contents such as settings by the input interface.

The reading unit drive motor 204 is a drive source for moving the reading unit 129 in the sub-scanning direction under the control of the CPU 202. When reading an image from the original placed on the platen 118 or reading the shading reference plate 128, the CPU 202 moves the reading unit 129 in the sub-scanning direction by the reading unit drive motor 204.

The original conveyance motor 205 is a drive source for rotationally driving various rollers arranged along the conveyance path 130. When the ADF 102 is used to read the image of the original P, the CPU 202 controls the original conveyance motor 205 to feed the original P from the original tray 104. The original conveyance motor 205 is a pulse motor, for example. The original conveyance motor 205 performs a conveyance control of the original P according to the number of pulses input from the CPU 202.

The CPU 202 controls the operation of the line sensor 125. The line sensor 125 converts the received reflected light into an electrical signal and outputs it. The line sensor 125 includes a plurality of the line sensors to receive reflected light of a plurality of colors to read an image in a plurality of colors. In the present embodiment, to receive the reflected light of three colors of R (red), G (green), and B (blue), the line sensor 125 includes three line sensors each corresponding to respective color. The electrical signal output from the line sensor 125 is an analog voltage of each color corresponding to R, G, and B.

The AD converter 206 obtains the analog voltage of each color from the line sensor 125. The AD converter 206 converts the obtained analog voltage of each color into reading data which is a digital value. Each reading data converted from the analog voltage of each color by the AD converter 206 is transmitted to the reading image processing unit 207. The reading image processing unit 207 performs a predetermined processing on the reading data of each color to generate image data representing the read image. The reading image processing unit 207 stores the image data generated by reading the original P in the storage unit 208. Further, the result of the character recognition by the OCR can also be stored in the storage unit 208. The image data generated by reading the original P may be directly transmitted to the printer 200 or another external device.

The image reading apparatus 100 of such the configuration operates as follows, when copying the original P, for example. At the time of copying, a user places the original P in the original tray 104, and inputs instructions of the copy process with the operation panel 201.

The CPU 202 moves, upon receiving instructions of the copy process obtained via the operation panel 201, lamps 119 and 120, and the reflection mirror 121 to the reading position of the shading reference plate 128 by the reading unit drive motor 204. The CPU 202 controls the reading unit 129 to read the shading reference plate 128 to perform shading correction.

In the shading correction, analog voltages of R, G, and B colors representing the reading result of the shading reference plate 128 output from the line sensor 125 are input to the AD converter 206. The AD converter 206 converts the analog voltages of each color into the reading data to transmit the same to the reading image processing unit 207. The reading image processing unit 207 performs the shading correction so that the reading data (digital value) that are reading results of the shading reference plate 128 may become almost the same value.

After completing the shading correction, CPU 202 moves lamps 119 and 120 and the reflection mirror 121 to the reading position of the original P by the reading unit drive motor 204. Then, the CPU 202 starts conveying the original P on the original tray 104 by the original conveyance motor 205. The reading unit 129 reads the white guide member 114 until the original P is conveyed to the reading position. Upon detecting the original P by the original detection sensor 127, the CPU 202 reads the original P by the reading unit 129 as described above. Based on the reading result of the white guide member 114 and the reading result of the original P, the position of the streak image caused by the adhering substance adhering to the platen 118 is specified. The details of the streak image detection processing for specifying the position of the streak image will be described later. The streak image in the image data obtained by reading the original P is corrected as necessary and transmitted to the printer 200. The printer 200 forms an image on the sheet based on the obtained image data. The copy process is performed as above.

Although not shown, the printer 200 is also equipped with a controller for controlling the operation. The controller of the printer 200 can communicate with the CPU 202 of the image reading apparatus 100. The operation panel 201 is connected to the controller of the printer 200. The CPU 202 of the image reading apparatus 100 obtains the instruction input from the operation panel 201 via the controller of the printer 200. For example, an instruction for copy process is input from the operation panel 201 to the controller of the printer 200. When the controller of the printer 200 obtains the copy process instruction from the operation panel 201, the controller instructs the CPU 202 to perform the copy process. According to this instruction, the CPU 202 operates during the above copy process.

<Image Reading Processing Unit>

Figure 4:
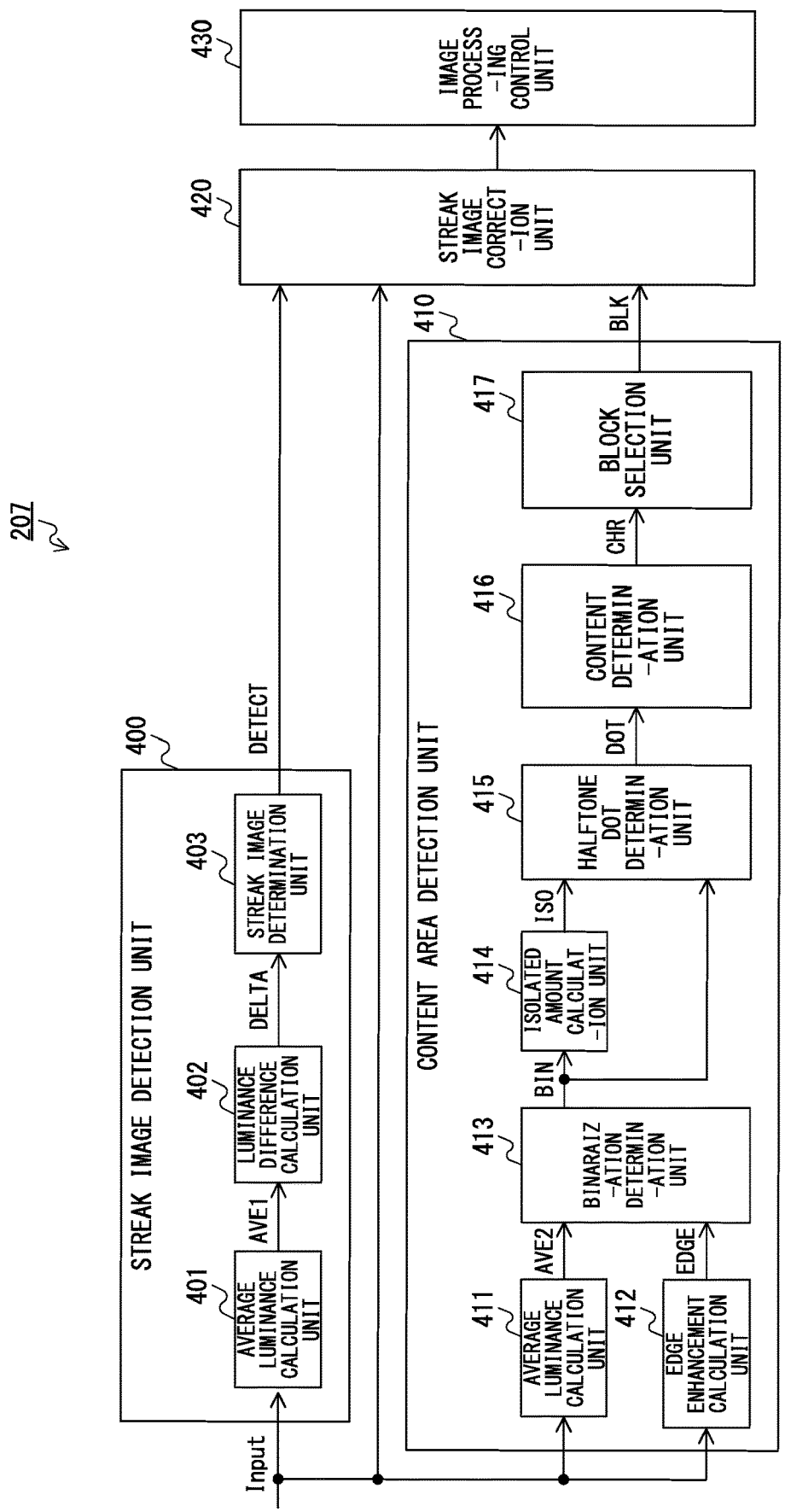
FIG. 4 is a configuration view of a reading image processing unit.

FIG. 4 is an explanatory configuration view of the reading image processing unit 207. The reading image processing unit 207 includes a streak image detection unit 400, a content area detection unit 410, a streak image correction unit 420, and an image processing control unit 430. The reading image processing unit 207 detects the streak image and the content area (character area) based on the read data obtained from the AD converter 206, and erases the streak image while preventing erasing the content. Thereby the image reading apparatus 100 maintains the readability of small size characters while maintaining the character detection accuracy by OCR.

<Streak Image Detection>

The streak image detection unit 400 includes an average luminance calculation unit 401, a luminance difference calculation unit 402, and a streak image determination unit 403. The streak image detection unit 400 detects the streak image while reading the original P by the predetermined number of lines after detecting the original P by the original detection sensor 127. When the original P contains printing information such as a hyphen or thin line, it is difficult to distinguish the printed thin line from the streak image caused by the adhering substance. Therefore, the streak image detection unit 400 previously reads the white guide member 114 at a timing when the original P does not exist in the reading position to obtain reading data. Then, from the obtained reading data, the streak image detection unit 400 specifies a candidate (streak pixel candidate) for an abnormal pixel which forms the streak image in the main scanning direction. Further, the streak image detection unit 400 identifies a candidate (streak pixel candidate) for an abnormal pixel which forms the streak image from the read data obtained by reading the original P at a timing when the original P exists at the reading position. The streak image detection unit 400 compares, as to the streak pixel candidate obtained from the reading result of the white guide member 114 and the streak pixel candidate obtained from the reading result of the original P, the positions in the main scanning direction. In a case where the streak pixel candidate is found at the same position (pixel) in the main scanning direction in each of the reading results, the pixel is determined to be the streak pixel.

When the adhering substance adheres to the white guide member 114, since the original P passes along a side closer to the white guide member 114 than the reading unit 129, in the reading result of the original P, there is no streak image caused by the white guide member 114. However, when the adhering substance is on the platen 118, since the platen 118 is located closer to the reading unit 129 than the original P, the streak image caused by the adhering substance occurs in the reading result of the original P. Therefore, the streak image detection unit 400 identifies the streak pixel candidate from the respective reading data of the white guide member 114 and the original P Then, the streak image detection unit 400 detects the streak pixel candidate to be the streak pixel in a case where the streak pixel candidate is found at the same position (pixel) in the main scanning direction in each of the reading data.

The streak image detection unit 400 detects the streak pixel candidate for each pixel in the main scanning direction based on the luminance value of each pixel included in the reading data obtained from the AD converter 206. As to the pixel which the difference between the average value of the luminance values in the vicinity of the target pixel and the luminance value of the target pixel is equal to or greater than a predetermined threshold value, the streak image detection unit 400 determines that the pixel is within the range of the streak image candidate. The streak image detection unit 400 notifies the streak image correction unit 420 of the detected range of the streak image candidate. Each part of the streak image detection unit 400 will be described.

The average luminance calculation unit 401 calculates the average luminance value in a predetermined area (for example, an area of 7 pixels in the X direction and 7 pixels in the Y direction) based on the luminance value of the pixels included in the read data. Assuming that the coordinate of the main scanning direction of the target pixel is X and the coordinate of the sub-scanning direction of the target pixel is Y, and referring to each of the three pixels before and after the target pixel, the average luminance value AVE1 is calculated by Formula 1 below.

$$AVE\,1[X][Y] = \frac{1}{49} \times \sum_{A=X-3}^{X+3} \sum_{B=Y-3}^{Y+3} INPUT[A][B] \quad \text{Formula 1}$$

The average luminance value AVE1 is sent to the luminance difference calculation unit 402. The luminance difference calculation unit 402 calculates the luminance difference DELTA between the average luminance value AVE1 and the luminance value of the target pixel. The luminance difference DELTA is calculated by the following Formula 2.

$$DELTA[X]=|INPUT[X]=AVE1[X][Y]| \quad \text{[Formula 2]}$$

The streak image determination unit 403 determines that the adhering substance adheres to the target pixel when the luminance difference DELTA is larger than the predetermined threshold value THdetect. The streak image determination unit 403 performs this determination of the adhering substance of the target pixel for each line of the main scanning direction. The streak image determination unit 403 counts the number of pixels of the target pixels which are determined that the adhering substance continuously adheres in the sub-scanning direction. The count result is stored as DUST [X] and is calculated by the following Formula 3.

if $DELTA[X] \geq TH_{detect}$,DUST[X]=DUST[X]+1 else $DELTA[X] TH_{detect}$,DUST[X]=DUST[X] [Formula 3]

The streak image determination unit 403 performs such the operation for each line at each position in the main scanning direction. When the count value DUST [X] at a position where it is determined that the adhering substance has adhered after the calculation for a predetermined number of lines is equal to or higher than the predetermined value, the streak image determination unit 403 determines that the pixel at the position in the main scanning direction is a candidate for the streak pixel. The determination result DUST of the streak pixel candidate is calculated by the following Formula 4.

if $DUST[X] \geq TH_{cocount}$,DETECT[X]=1 else $DUST[X] < TH_{count}$,DETECT[X]=0 [Formula 4]

Based on the respective reading data of the white guide member 114 and the original P, the streak image detection unit 400 determines that the streak pixel candidate exists at the pixels to which the adhering substance continuously adheres over a predetermined line, as described above. Among the streak pixel candidates of the white guide member 114 and the original P, when the streak pixel candidate of the white guide member 114 and the streak pixel candidate of the original P have the same position (pixel), the streak pixel candidate is detected to be the streak pixel. In this way, it is determined that the streak image has occurred at the position in the main scanning direction where it is determined that there are streak pixels that continues for a predetermined number of lines or more. Since the adhering substance is a particle such as paper powder, it may move during the reading processing, and a false detection may occur when identifying the position of the adhering substance in a single line. This is the reason why detecting the streak pixels that continues for a predetermined number of lines or more. Hereinafter, the pixel corresponding to the position of the streak image in the main scanning direction is referred to as "abnormal pixel".

Figure 5A:
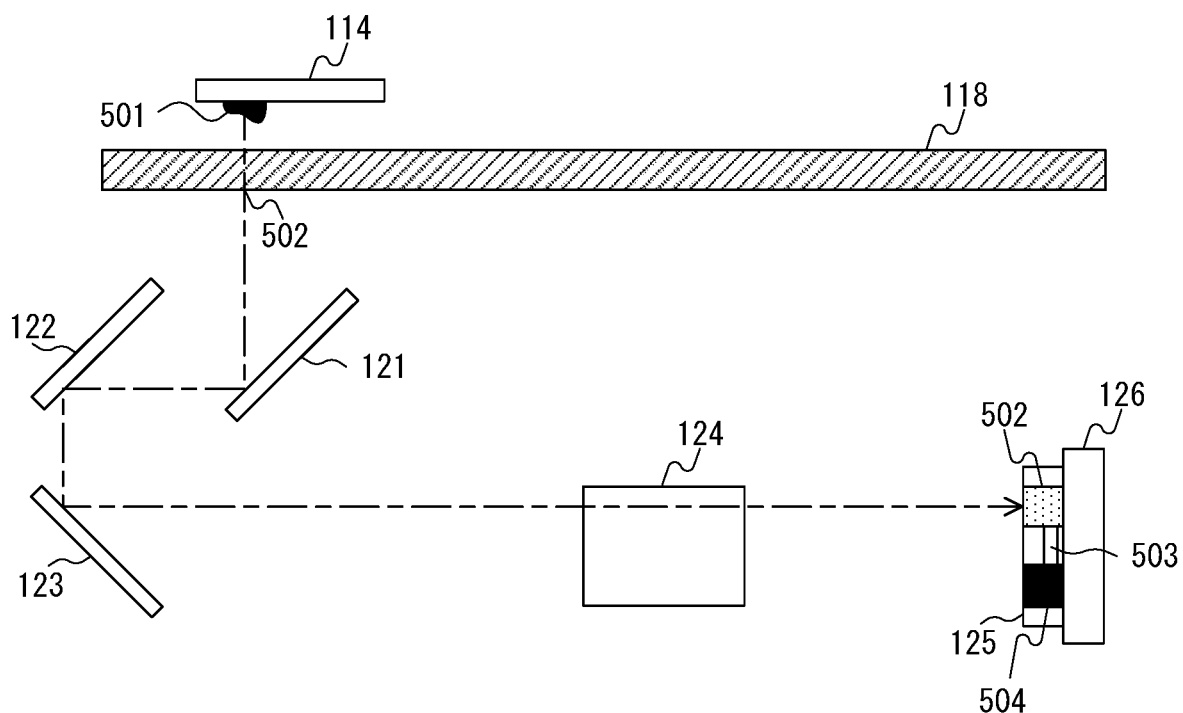
FIG. 5A and FIG. 5B are exemplary views representing relationship between an adhering substance and a line sensor.
Figure 5B:
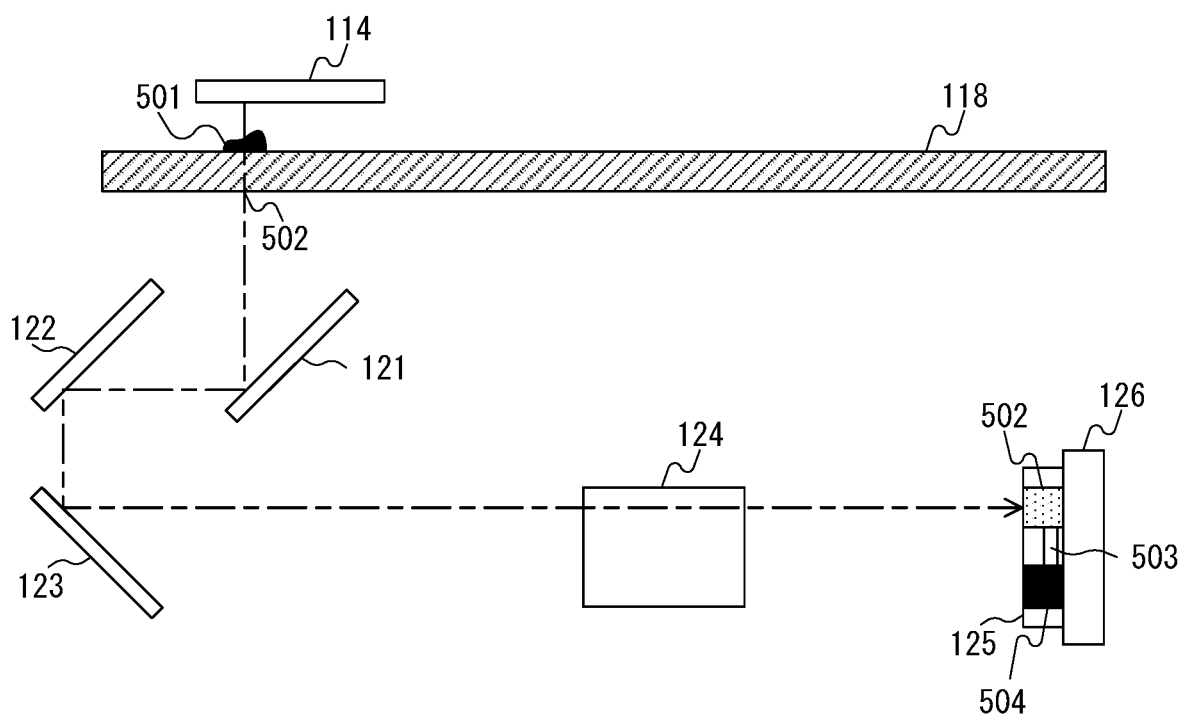

FIGS. 5A and 5B are explanatory views of the relationship between the dust (adhering substance) adhering to the reading position and the line sensor 125. In the line sensor 125, a plurality of imaging devices are arranged in the main scanning direction. The reflected light reflected by the white guide member 114 or the original P is imaged on a light receiving surface of the line sensor 125 by the imaging lens 124 via the reflection mirrors 121, 122, and 123. In FIG. 5A, the dust 501 is on the reading position of the white guide member 114. In FIG. 5B, the dust 501 is on the reading position of the platen 118. In FIG. 5A, the reflected light received by the line sensor 125 from the white guide member 114 is partially blocked by the dust 501 adhering to the white guide member 114. In FIG. 5B, the reflected light received by the line sensor 125 from the white guide member 114 is partially blocked by the dust 501 adhering to the platen 118.

Hereinafter, the method of detecting a position of an abnormal pixel will be described. First, the output of the line sensor 125 when the line sensor 125 reads the white guide member 114 will be described.

Figure 6:
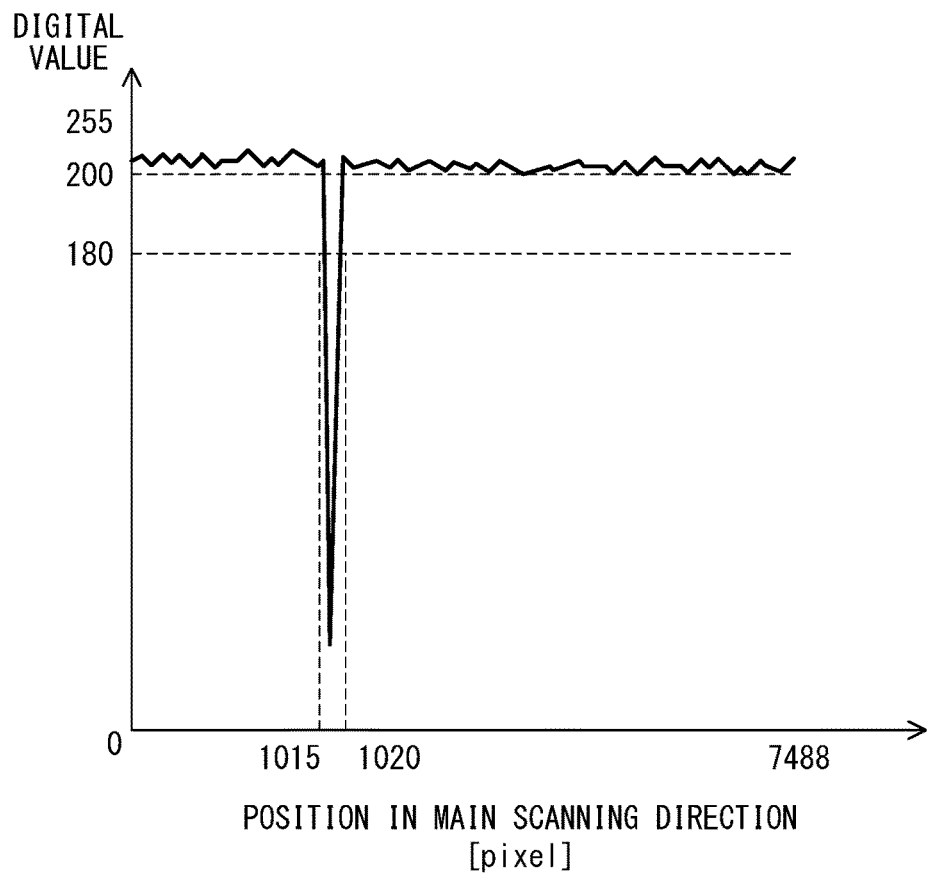
FIG. 6 is an exemplary view of a digital value of each position in the main scanning direction.

FIG. 6 is an exemplary view of reading data (digital value) at each position in the main scanning direction based on the reading result output from the line sensor 125 when dust 501 adheres to the reading position 502. In FIG. 6, the horizontal axis represents each position in the main scanning direction, and the vertical axis represents the digital value of the reading data. In a case where the AD converter 206 is configured to output an 8-bit digital value, the digital value of the read data when the analog voltage output from the line sensor 125 is AD-converted is a value in a range of 0 to 255.

In a case where the white guide member 114 is read after shading correction, the digital values become substantially the same. However, as shown in FIG. 5A, for example, when the dust 501 is on the white guide member 114 at the reading position 502, the light emitted to the white guide member 114 is blocked by the dust 501 at the position where the dust 501 is located. Therefore, the digital value at this position is smaller than the value at another position. The streak image detection unit 400 compares the digital value for each position in the main scanning direction when the white guide member 114 is read with a predetermined threshold value. As a result of comparison, the streak image detection unit 400 determines a pixel corresponding to a position where the digital value is smaller than a predetermined threshold value as a candidate for the abnormal pixel (abnormal pixel candidate).

As shown in FIG. 5B, when the dust 501 is on the platen 118 at the reading position 502, the light emitted to the white guide member 114 is blocked by the dust 501 at the position where the dust 501 is located. Therefore, the digital value at this position is smaller than the values at the other positions. The streak image detection unit 400 compares the digital value for each position in the main scanning direction when the white guide member 114 is read with a predetermined threshold value. As a result of the comparison, the streak image detection unit 400 determines a pixel corresponding to a position where the digital value is smaller than a predetermined threshold value as a candidate for the abnormal pixel (abnormal pixel candidate).

In the example of FIG. 6, the average luminance value AVE1 when the white guide member 114 is read is about "200", and the luminance difference DELTA is "20". Therefore, when a threshold value is set to, for example, "180", it can be determined that the dust 501 adheres to the reading position where the digital value is lower than "180", and the streak image occurs. In the example of FIG. 6, the pixels at the positions 1015 to 1020 in the main scanning direction are determined to be abnormal pixel candidates.

Next, the output of the line sensor 125 when the image of the original P passing through the reading position 502 is read by the line sensor 125 will be described.

As shown in FIG. 5A, in a case where the dust 501 is on the white guide member 114 in the reading position 502, when the original P passes over the platen 118, the dust 501 is hidden by the original P when viewed from the line sensor 125. As a result, the streak image caused by the dust 501 does not appear in the image representing the reading result of the original P. That is, the values at the positions 1015 to 1020 in the main scanning direction in FIG. 6 do not become smaller than the predetermined threshold value due to the dust 501.

As shown in FIG. 5B, when the dust 501 is on the platen 118 at the reading position 502 and the original P passes over the platen 118, the original P is hidden by the dust 501 when viewed from the line sensor 125. As a result, the streak image caused by the dust 501 appears in the image representing the reading result of the original P. That is, the values at the positions 1015 to 1020 in the main scanning direction in FIG. 6 become smaller than the predetermined threshold value due to the dust 501. The streak image detection unit 400 determines a pixel corresponding to a position where the digital value is smaller than a predetermined threshold value as a candidate for the abnormal pixel (abnormal pixel candidate).

The streak image detection unit 400 determines the abnormal pixel based on the image data obtained during a period of time from the start of reading until the image of a predetermined length is read from the leading edge of the original P. If the abnormal pixel candidate continuously appears in the sub-scanning direction at the same position in the main scanning direction in the streak image of the period, the streak image detection unit 400 determines, among the abnormal pixel candidates, the pixel at the position in the main scanning direction as the abnormal pixel. That is, if the streak image appears continuously before and after the original P reaches the reading position 502, the streak image detection unit 400 determines, in the streak image, the pixel at the position in the main scanning direction as the abnormal pixel.

<Streak Image Correction>

Figure 7:
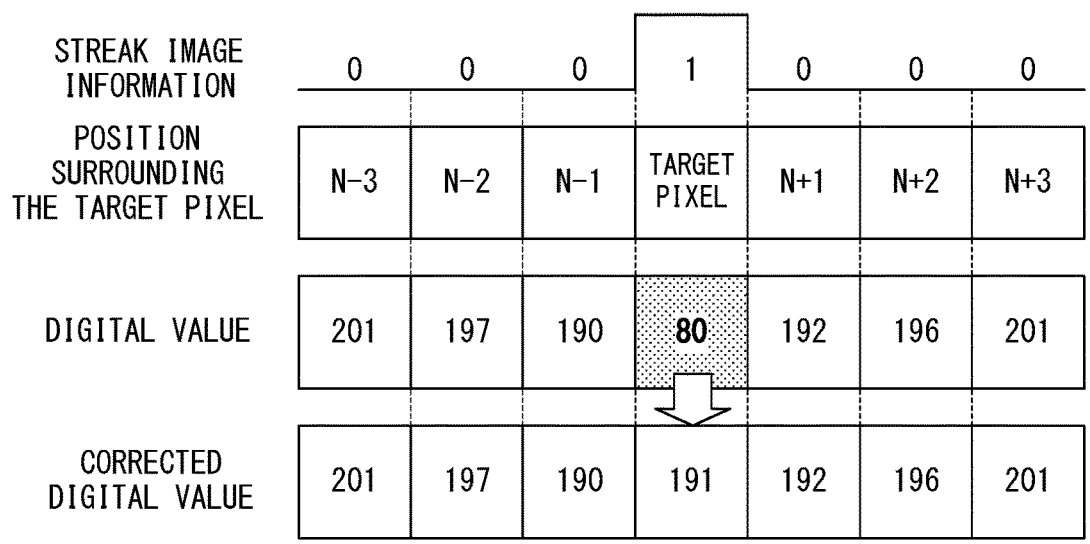
FIG. 7 is an explanatory view of a streak image correction processing.

FIG. 7 is an explanatory view of the streak image correction processing. The streak image determination unit 403 outputs the detection result of the streak image as the streak image information (DETECT). In the streak image information, "1" is set for the pixel in the main scanning direction at which it is determined that the streak image has occurred and "0" is set for the pixel which is determined that the streak image has not occurred. With the streak image information, it is possible to know which pixel in the main scanning direction has the streak image has arisen. The streak image correction is performed based on the streak image information.

In the streak image information in FIG. 7, the target pixel is "1", which indicates that the streak image has occurred at the target pixel. As to the pixels N−3, N−2, N−1, N+1, N+2, and N+3 surrounding (near) the target pixel in the main scanning direction, the streak image information is "0". This indicates that the streak image has not occurred. The digital value of the target pixel is "80", which is smaller than the digital value of the pixel which is at a position surrounding (or near) the target pixel.

Firstly, the streak image correction unit 420 specifies the pixel (position) of the streak image based on the streak image information obtained from the streak image determination unit 403. Next, the streak image correction unit 420 refers to the digital value of the pixel (position) adjacent to the specified position of the streak image in the main scanning direction to thereby interpolate linearly the digital value of the pixel of the streak image. By performing the linear interpolation, the streak image is removed.

In the example of FIG. 7, the digital values of the position N−1 and the position N+1 adjacent to the target pixel, at which the streak image has occurred, are "190" and "192", respectively. Assuming that the digital value of the target pixel is D [N], the digital values of the adjacent pixels are D [N−1] and D [N+1], and the corrected (after linear interpolation) digital value of the target pixel is D [N]', the digital value D [N]' is expressed by the following Formulas.

$$D[N]'=D[N-1]+(D[N+1]-D[N-1])/2 \qquad 5$$

$$D[N]'=190+(192-190)/2=191$$

Therefore, the digital value D [N]' of the target pixel after linear interpolation is "191". By converting the digital value "80" of the target pixel before the correction to "191" as described above, the streak image correction unit 420 performs the streak image correction.

<Content Area Detection>

The content area detection unit 410 detects a content area (character area) based on the luminance value of each pixel included in the reading data obtained from the AD converter 206. The content area detection unit 410 calculates the difference between the average luminance value in the vicinity of the target pixel and the luminance value of the edge-enhanced reading data, and performs binarization such that a pixel whose difference is less than or equal to a predetermined threshold is binarized to be "1" and a pixel whose difference exceeds the threshold is binarized to be "0". The content area detection unit 410 detects an isolated pixel group by detecting a pixel whose binarized result (binarized data) matches a predetermined pattern by pattern matching.

The content area detection unit 410 excludes a halftone dot area from the binarized data by converting the detected isolated pixel group from "1" to "0". The content area detection unit 410 determines the area in which the halftone dot area is excluded to be an area with content. The content area detection unit 410 determines whether or not a pixel with content is included in each predetermined area. By determining the area including the pixel with content as "1" and the area not including content as "0", the area near the image with content is detected.

As described above, the streak image correction unit 420 performs the streak image correction for the area having the streak image near the position in the main scanning direction based on the streak image information obtained from the streak image detection unit 400. However, the streak image correction unit 420 does not perform the streak image correction for the area determined by the content area detection unit 410 to include content. As a result, the content is processed so that the streak image correction is not applied. The reading data for which the streak image is corrected is transmitted to the image processing control unit 430 without erasing the information in the vicinity of the content. Therefore, erasure of the content due to the streak image correction is prevented.

Each part of the content area detection unit 410 will be described. The content area detection unit 410 includes an average luminance calculation unit 411, an edge enhancement calculation unit 412, a binarization determination unit 413, an isolated amount calculation unit 414, a halftone dot determination unit 415, a content determination unit 416, and a block selection unit 417.

As in the average luminance calculation unit 401 of the streak image detection unit 400, the average luminance calculation unit 411 calculates the average luminance value in a predetermined area (for example, an area of 7 pixels in the X direction and 7 pixels in the Y direction) based on the luminance value of the pixels included in the read data. Assuming that the coordinate of the main scanning direction of the target pixel is X and the coordinate of the sub-scanning direction of the target pixel is Y and referring to each of the three pixels before and after the target pixel, the average luminance value AVE2 is calculated by Formula 5 below.

$$AVE2[X][Y] = \frac{1}{49} \times \sum_{A=X-3}^{X+3} \sum_{B=Y-3}^{Y+3} \text{INPUT}[A][B] \qquad \text{[Formula 5]}$$

The edge enhancement calculation unit 412 performs an edge enhancement processing to the reading data, in order to detect the content area and the halftone dot area from the reading data obtained from AD converter 206. In a case where the target pixel is multiplied by a 7×7 filter coefficient K for each of the before and after 3 pixels of the target pixel for both in the main scanning direction and in the sub-scanning direction, the luminance value EDGE after edge enhancement of the reading data is calculated by the Formula 6 as follows.

$$EDGE[X][Y]=\Sigma_{A=X-3}^{X+3}\Sigma_{B=Y-3}^{Y+3}\text{INPUT}[A][B]\times K[A][B] \qquad \text{[Formula 6]}$$

FIGS. 8A to 8C are explanatory views of the edge enhancement processing. FIG. 8A shows an image based on the reading data in which the luminance value of the background is "200", the luminance value of the diagonal line is "150", and the luminance value of the isolated point is "190". The size of the image is 10×10 pixels. FIG. 8B represents an edge enhancement filter with a size of 5×5 pixels. FIG. 8C represents the luminance value of the reading data after the edge enhancement filter is subjected to convolution calculation processing based on the above Formula 4. In a case where the result of performing the convolution calculation processing by the Formula 4 is a value of 0 or less, the result is clipped to "0", and in a case where the result of performing the convolution calculation processing by the Formula 4 is a value of 255 or more, the result is clipped to "255".

In the reading data (FIG. 8C) after the convolution calculation processing, the luminance value of the diagonal line is "255" and the edge is enhanced. The luminance value of the background is "0" due to edge enhancement. The edges are extracted in this way. An isolated point having a small luminance difference with respect to the luminance value of the background is not significantly enhanced after edge enhancement, thus its luminance value becomes "80".

The binarization determination unit 413 compares the difference between the average luminance value AVE2, which is the output of the average luminance calculation unit 411, and the luminance value EDGE, which is the output of the edge enhancement calculation unit 412, with the threshold value THedge. The binarization determination unit 413 outputs a binarized data BIN which is "1" when the difference is equal to or less than the threshold value THedge and "0" when the difference is larger than the threshold value THEdge. Due to this binarization processing, information clearly printed on the original such as characters and dots in halftone dot printing are enhanced and extracted. The binarization determination unit 413 performs the binarization determination by the following Formula 7.

$$\text{if } |EDGE[X][Y]-AVE2[X][Y]| \leq TH_{edge}, BIN=1$$

$$\text{else } |EDGE[X][Y]=AVE2[X][Y]| > TH_{edge}, BIN=0 \qquad \text{[Formula 7]}$$

In the example of FIG. 8C, the binarization processing is performed with the threshold value THEdge as "100", the pixel having the difference of 100 or more as "0", and the pixel having the difference of 99 or less as "1". As a result, for only the pixel with the diagonal line, BIN=1, thus the diagonal line can be extracted.

The threshold value THedge is set to a value such that the content is detected and the streak image is not detected. As to the streak image and the content printed on the accounting document, the luminance value of the content tends to be lower than the luminance value of the streak image. The adhering substance is mainly the paper dust or the like that has peeled off when the original P is conveyed by the ADF 102. Since the particle size of the paper dust is small, the luminance value when the image is read tends to be higher than the luminance value of the content. Therefore, the luminance value of the streak image is higher than the luminance value of the content.

The isolated amount calculation unit 414 detects a pixel group in an isolated state in which a pixel having BIN=1 does not exist in the surroundings, as in halftone dot printing printed on the original P. The isolated amount calculation unit 414 previously prepares a pattern matching image that assumes an image when the halftone dots are read, and detects a region in which an image matching this image is found as a pixel group in the isolated state. The halftone dot determination unit 415 converts the value of the binarized data BIN of the detected pixel group from "1" to "0". By such processing, the halftone dot area can be removed from the binarized data.

Figures 9A, 9B, 9C:
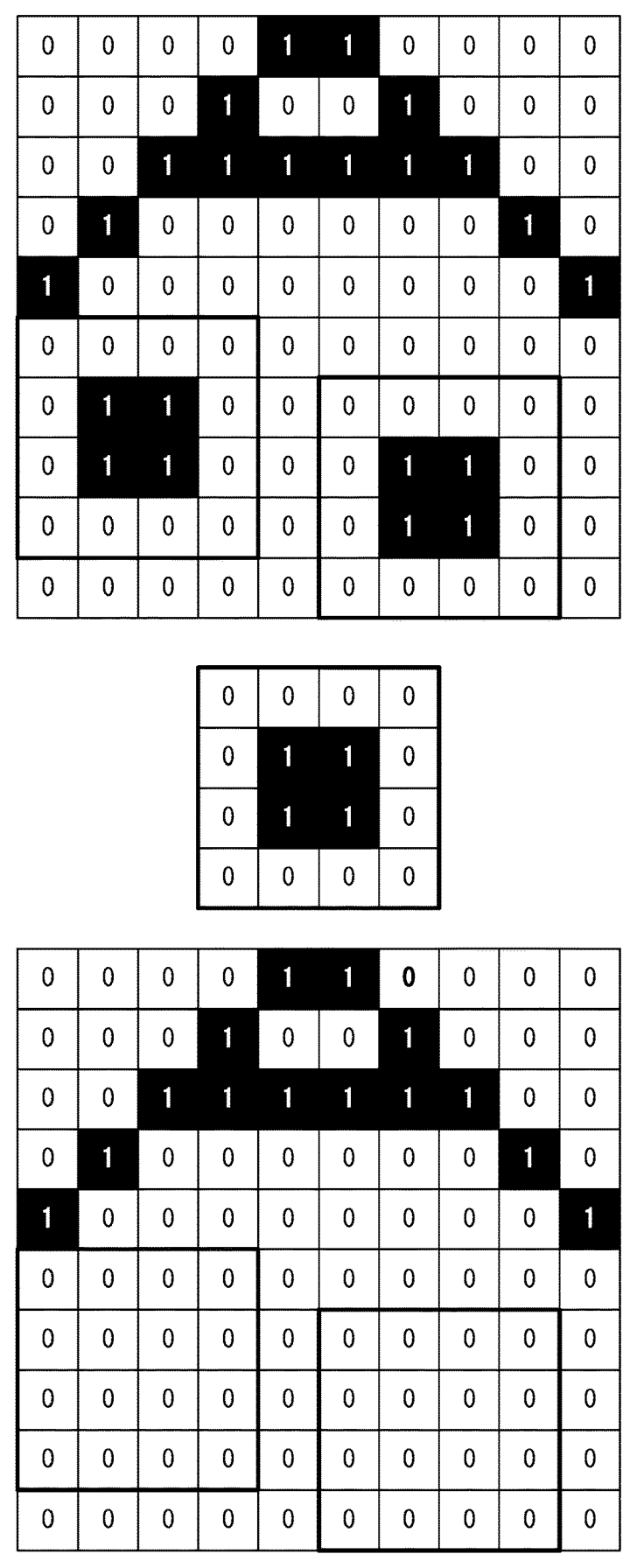

FIGS. 9A to 9C are explanatory views of processing of the isolated amount calculation unit 414 and the halftone dot determination unit 415. FIG. 9A is an exemplary view of the binarized data BIN. In FIG. 9A, the binarized data BIN, which includes the halftone dot area on which a character "A" and 2×2 dots, is printed. FIG. 9B represents a pattern matching image for detecting 2×2 dots. FIG. 9C represents binarized data after processing by the isolated amount calculation unit 414 and the halftone dot determination unit 415.

In the binarized data BIN of FIG. 9A, there are two regions that match the pattern matching image (i.e., the region surrounded by the thick frame of FIG. 9A). By converting the binarized data BIN in this region from "1" to "0", the binarized data of FIG. 9C is obtained. In this example, since the 2×2 dot area is removed and the character "A" remains, only the content is extracted by excluding the halftone dot area. The binarized data DOT excluding the halftone dot region is transmitted from the halftone dot determination unit 415 to the content determination unit 416. As shown in FIG. 9C, the content determination unit 416 determines that the pixel to which "1" is set as the content area from the binarized data DOT excluding the halftone dot area.

The block selection unit 417 performs area mapping by dividing the image read by the reading unit 129 into a predetermined size (for example, a rectangular size of 32×32 pixels) to detect the content area. FIGS. 10A to 10C are explanatory views of the processing of the block selection unit 417.

The block selection unit 417 determines whether or not the area includes a pixel whose binarized data DOT is "1" for each area to which the area mapping has been performed. The block selection unit 417 determines that the area including the pixel whose binarized data DOT is "1" includes the content. In the example of FIG. 10B, the character "A" is printed in a range which consists of Area11, Area12, Area21, and Area22. Since this area includes pixels whose binarized data DOT is "1", it is determined that the area surrounded by the thick frame includes the content.

As shown in FIG. 10C, the block selection unit 417 outputs an area determined to have content as "1" and outputs an area determined to have no content as "0". By such processing, an area in the vicinity of a pixel that has content is extracted.

In the present embodiment, as one example, in a case where a pixel whose binarized data DOT is "1" exists in a target area, it is determined that the target area contains the content. Alternatively, for example, when there are a predetermined number or more of pixels whose binarized data DOT is "1" in the target area, it may be determined that the target area includes content. Further, in a case where the number of pixels in which the binarized data DOT is "1" is calculated in each area, it is presumed that the area with a small number of pixels does not include the content. From this, as to a plurality of the areas with a small number of pixels which the binarized data DOT is "1", the average value of the number of the pixels which the binarized data DOT is "1" is calculated. In a case where the difference between this average value and the number of pixels in which the binarized data DOT is "1" of the target area is a predetermined number or more, it may be determined that the target area includes the content.

The output data BLK of the block selection unit 417 is transmitted to the streak image correction unit 420. The streak image correction unit 420 performs linear correction for the purpose of removing the streak image, as described above. In the present embodiment, the streak image correction unit 420 prevents erasure of the content by not performing the streak image correction in the area where the output data BLK obtained from the block selection unit 417 is "1".

The area where the output data BLK is "1" is the content area.

Figure 11A:
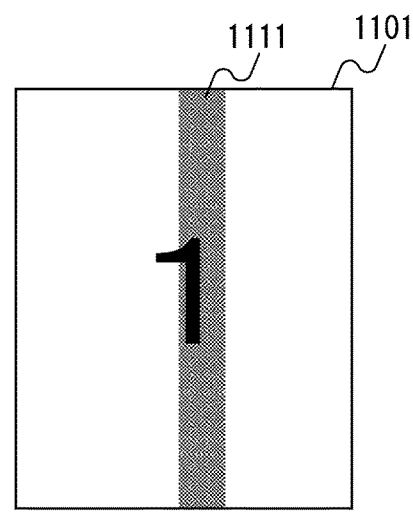
FIG. 11A, FIG. 11B, and FIG. 11C are explanatory views of a streak image correction.
Figure 11B:
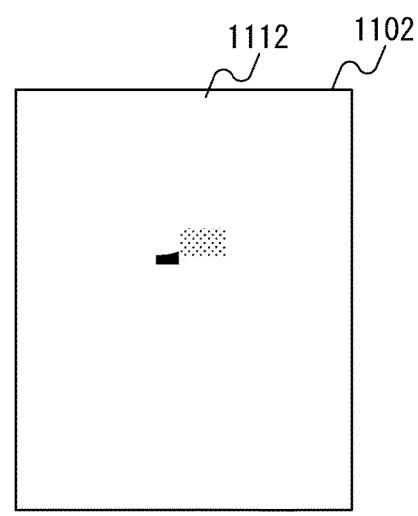
Figure 11C:
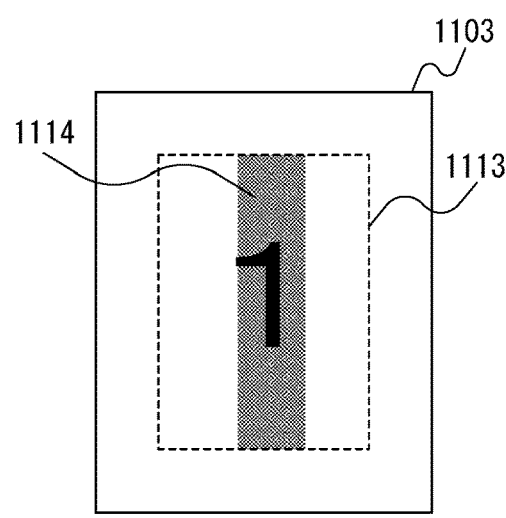

FIGS. 11A to 11C are explanatory views of the streak image correction. FIG. 11A is an exemplary view of the image 1101 in the vicinity of the character of the original on which the character "1" is printed and the streak image 1111. FIG. 11B represents a case where the streak image correction is performed in the entire image of FIG. 11A. FIG. 11C represents a case where the streak image correction is not performed in the content area detected by the block selection unit 417 in the image of FIG. 11A.

In FIG. 11A, the character "1" is printed, and the streak image 1111 has occurred at a position overlapping the character. In FIG. 11B, the printed character "1" is almost lost by performing the streak image correction for the entire image, and the readability of the content is deteriorated. FIG. 11C represents an image when the streak image correction is not performed in the content area 1113 detected by the block selection unit 417. Since the streak image correction is not performed in the content area 1113, the streak image 1114 remains in the image in the content area 1113, and the streak image outside the content area 1113 is erased.

Figures 12A, 12B, 12C:
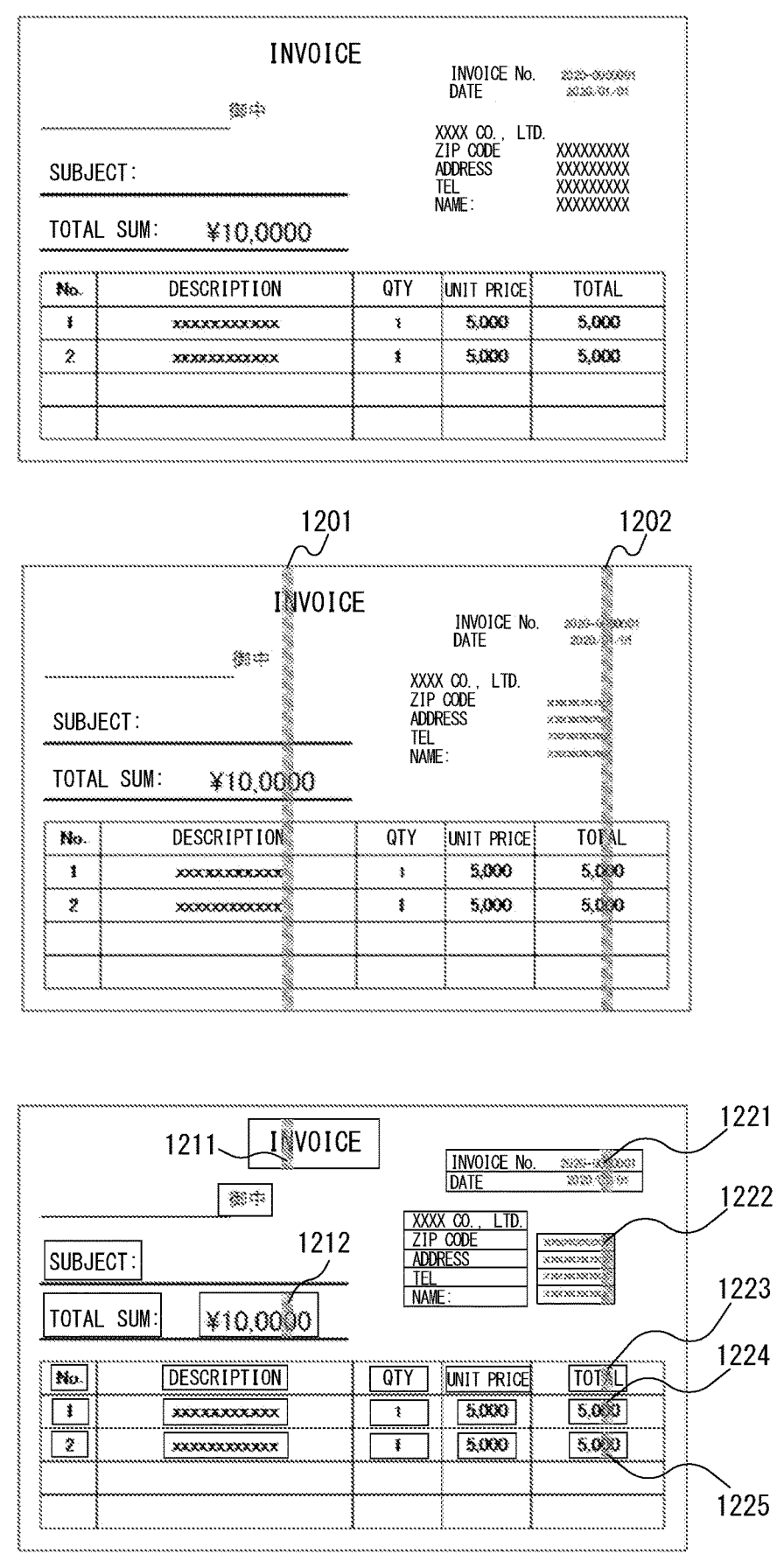

FIGS. 12A to 12C are explanatory views of the streak image correction for the accounting document. FIG. 12A is an exemplary view of the reading image obtained by reading an invoice, which is an example of the accounting document, by the reading unit 129. The reading image of this invoice does not have the streak image. FIG. 12B is an exemplary view of the reading image of the invoice when the streak images 1201 and 1202 occur in two locations in the main scanning direction. FIG. 12C is an exemplary view of the reading image of the invoice when the streak image correction is not performed in the content area in the image of FIG. 12B. The frame shown in the vicinity of the content area in FIG. 12C indicates an area determined to be the content area by the block selection unit 417. The streak image correction is not performed for the streak image 1211, 1212, 1221, 1222, 1223, 1224, 1225 in this frame.

In the image reading apparatus 100 of the present embodiment, the accounting document is treated as a specific original, and is read in a special reading mode. This is because the content is treated as extremely important information in the accounting document such as an invoice, and the erasure of the content may lead to conversion to incorrect information. In a case where a number (letter) in the invoice is erased, it may lead to the falsification of the invoice amount, issue date of the invoice, and expiration date, so the erasure of the content becomes a serious problem. Therefore, in an area that contains content, priority is given to not performing image processing, and the streak image correction is not performed.

As to the streak image correction performed outside the content area, the risk of erasure of content is low since no content is in the area. Further, as shown in FIG. 12B, in a case where the streak image correction is not performed outside the content area, the streak image remains in the entire area of the sub-scanning direction of the reading image, which is unpleasant for the user. Therefore, the streak image correction is performed outside the content area.

Figure 13A:
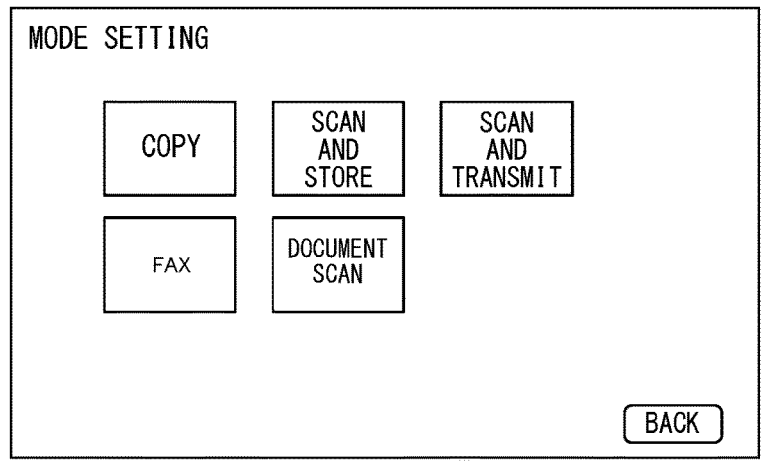
FIG. 13A, FIG. 13B, and FIG. 13C are explanatory views of a setting screen.
Figure 13B:
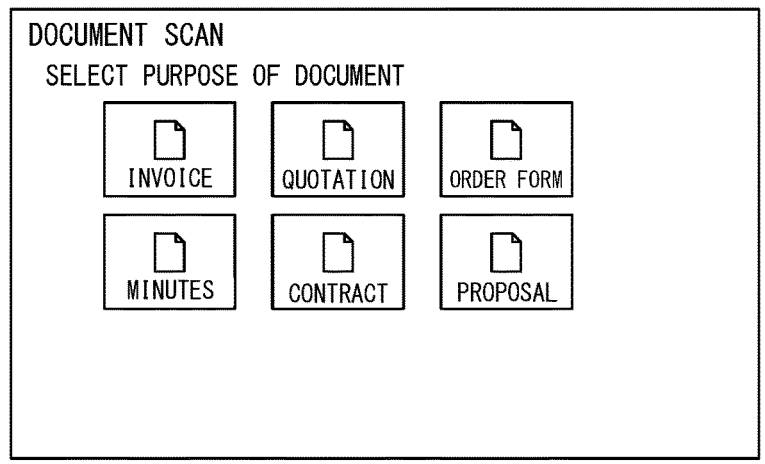
Figure 13C:
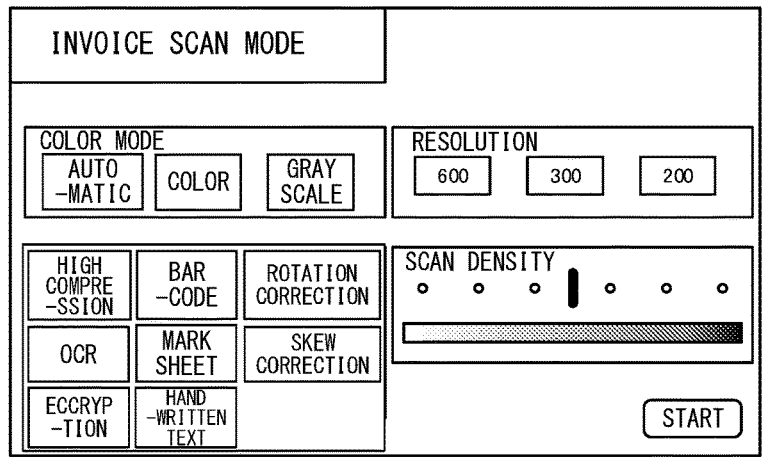

FIGS. 13A to 13C are exemplary views of a setting screen displayed on a display of the operation panel 201 when the reading mode for the specific original is set. It is noted that FIGS. 13A to 13C are examples for explaining the present embodiment, and the setting screen is not limited to these screens as long as a reading mode for the specific original such as the accounting document is provided.

FIG. 13A represents a processing mode setting screen. In FIG. 13A, in addition to "COPY" button and "SCAN AND STORE" button for storing a scanned image, which are provided as standard in the copier and the multifunction application, "DOCUMENT SCAN" button is separately provided in the same manner. The "DOCUMENT SCAN" button is a button for selecting a reading mode for the specific original. When the "DOCUMENT SCAN" button is pressed on the processing mode setting screen, the screen transitions to the setting screen of FIG. 13B.

FIG. 13B is an example of the top screen of the document scan mode setting screen. This setting screen displays options for the type of the original to be read, such as "invoice", "quotation", "order form", "minutes", "contract", and "proposal". By previously registering a folder for storing images read for each type of the original, it is possible to store the image which is read for each type of the original such as an invoice or a quotation into the registered folder. In addition, optional functions, such as displaying the OCR function in case of the invoice and displaying the mail transmission button in case of the minutes, can be set according to the type of each original. For example, when the "invoice" button is pressed on the screen of FIG. 13B, the screen transitions to the setting screen of the invoice scan mode of FIG. 13C.

FIG. 13C represents a top screen of the invoice scan mode, in addition to buttons for standard functions such as color mode and resolution settings, buttons for scan density, high compression, barcode, rotation correction, OCR, mark sheet, tilt correction, encryption, handwriting, etc., are provided. By displaying these frequently used functions on the top screen, the convenience of the image reading apparatus 100 can be improved. For example, when the OCR button is pressed and then the start button is pressed, OCR processing is performed on the read image, and the read image can be stored in the storage unit 208 as a PDF file containing content. The OCR processing is performed by the CPU 202, for example.

<Image Reading Processing>

Figure 14:
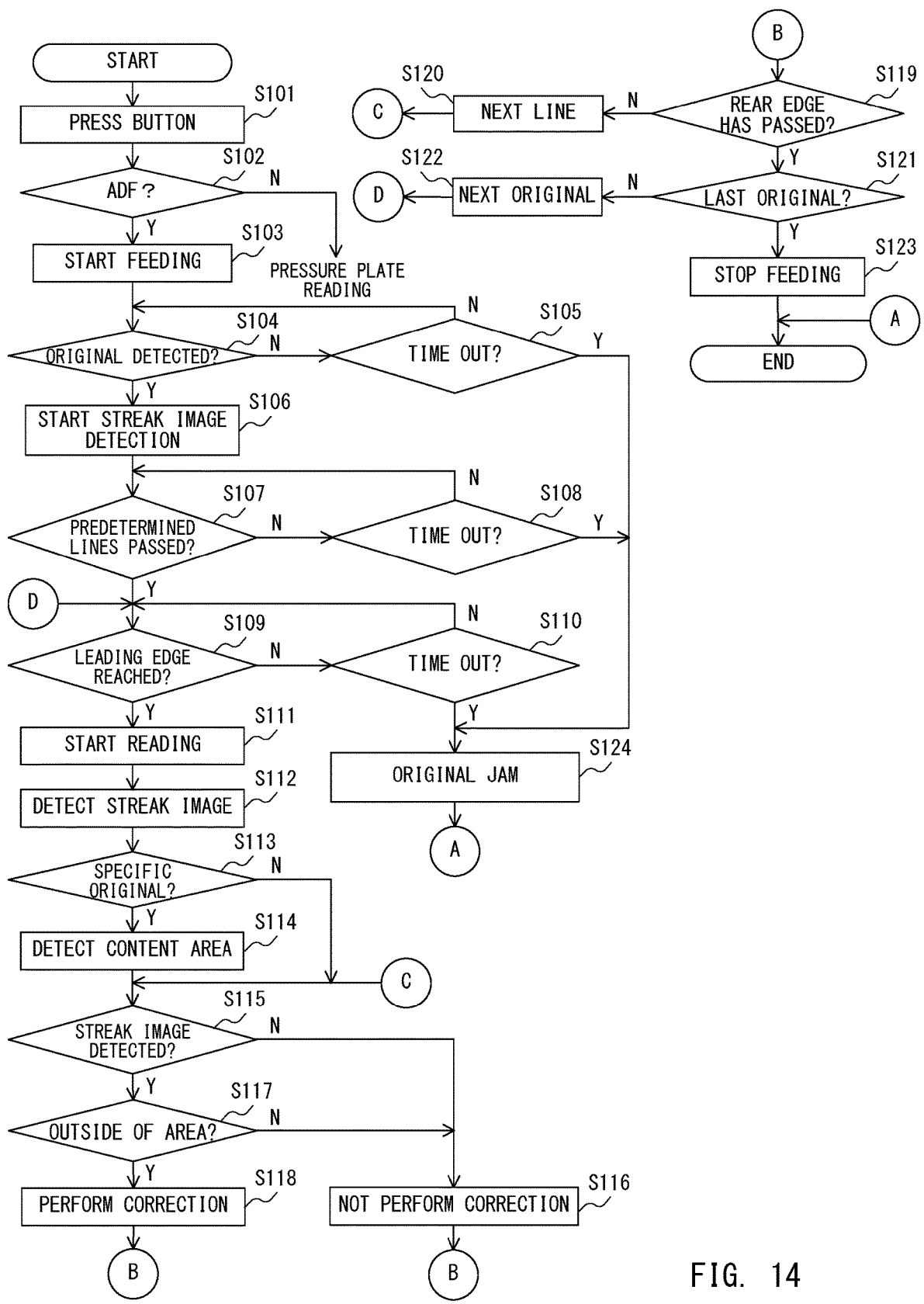
FIG. 14 is a flowchart representing image reading processing with image correction.

FIG. 14 is a flowchart representing the image reading processing including the streak image correction by the image reading apparatus 100 having the above configuration. This processing is started by pressing, by the user, an image reading start button provided on the operation panel 201. In addition, the reading mode for the specific original is set before pushing the image reading start button.

The CPU 202 determines that the user pressed the image reading start button provided on the operation panel 201 (Step S101). The CPU 202 detects the pressing of the image reading start button by obtaining a signal transmitted from the operation panel 201 when the image reading start button is pressed. The CPU 202 determines whether the original P is placed on the original tray 104 of the ADF 102 or not (Step S208). For example, a sensor for detecting presence or absence of the original on the original tray 104 is provided in the original tray, and this determination is performed based on the detection result of this sensor.

When the original P is not placed on the original tray 104 (Step S102: N), the CPU 202 reads the image of the original P placed on the platen 118 (pressure plate reading). When the original P is placed on the original tray 104 (Step S102: Y), the CPU 202 moves the lamps 119, 120, and the reflection mirror 121 to the reading position by the reading unit drive motor 204, and starts conveying the original P by the original conveyance motor 205.

The CPU 202 determines whether or not the original detection sensor 127 has detected the original P which is conveyed (Step S104). When the original detection sensor 127 does not detect the original P (Step S104: N), the CPU 202 determines whether or not a predetermined time has elapsed (Step S105). That is, the CPU 202 determines whether or not the original P has reached a detection position of the original detection sensor 127 before the lapse of a predetermined time. In a case where the original P does not reach the detection position of the original detection sensor 127 before the lapse of the predetermined time (Step S105: Y), the CPU 202 determines that a jam has occurred and ends the processing (Step S124).

In a case where the original P reaches the detection position of the original detection sensor 127 before the lapse of the predetermined time (Step S104: Y), the CPU 202 starts the detection of the streak image by the streak image detection unit 400 (Step S106). The CPU 202 reads the white guide member 114 with predetermined lines by the reading unit 129 within a predetermined time until the original P reaches the reading position (Steps S107 and S108). In a case where the original cannot be read by a predetermined number of lines within the predetermined time (Step S108: Y), the CPU 202 determines that a jam has occurred and ends the processing (Step S124).

In a case where the original is read by the predetermined number of lines within the predetermined time (Step S107: Y), the CPU 202 controls the conveyance amount of the original P by the number of pulses of the original conveyance motor 205 to determine whether the leading edge of the original P has reached the reading position within the predetermined time or not (Steps S109 and S110). The CPU 202 determines whether or not the original P has reached the reading position by determining whether or not a predetermined amount of the original P has been conveyed based on the number of pulses. In a case where the predetermined amount has not been conveyed within the predetermined time (Step S110: Y), the CPU 202 determines that the jam has occurred and ends the processing (Step S124). In a case where the predetermined amount of the original P has been conveyed within a predetermined time (Step S109: Y), the CPU 202 determines that the leading edge of the original P has reached the reading position.

In a case where the leading edge of the original P has reached the reading position, the CPU 202 starts reading the original P by the reading unit 129 (Step S111). The CPU 202 detects the streak image based on the streak pixel candidates obtained from the reading data of the original P and the reading data of the white guide member 114 (Step S112), respectively. As a result, the position of the streak image of the main scanning direction is specified. When the streak image detection is completed, the CPU 202 determines whether or not the reading mode for the specific original is set (Step S113). In a case where the reading mode for the specific original is set (Step S113: Y), the CPU 202 detects the content area by the content area detection unit 410 (Step S114). In a case where the reading mode for the specific original is not set (Step S113: N), the CPU 202 does not detect the content area.

The CPU 202 determines whether or not the streak image has been detected in the target pixel by the processing of Step S109 (Step S115). In a case where the streak image is detected (Step S115: Y), the CPU 202 determines whether or not the target pixel is outside the content area (Step S117). In a case where the target pixel is outside the content area (Step S117: Y), the CPU 202 performs the streak image correction by the streak image correction unit 420 (Step S118). In a case where the streak image is not detected (Step S115: N), or in a case where the target pixel is within the content area even if the streak image is detected (Step S117: N), the CPU 202 does not perform the streak image correction by the streak image correction unit 420 (Step S116). In a case where the reading mode for the specific original is not set, the streak image correction is executed regardless of the content area.

The CPU 202 repeats the processing of Steps S115 to S118 for each line until the trailing edge of the original P passes the reading position (Step S119: N, Step S120). In a case where the CPU 202 detects that the predetermined amount of the original P has been conveyed by the number of pulses of the original conveyance motor 205, the CPU 202 determines that the trailing edge of the original P has passed the reading position (Step S119: Y).

The CPU 202 determines, after the trailing edge of the original P has passed the reading position, whether or not the read original is the final one or not (Step S121). In a case where there is the next original in the original tray 104 and thus the read original is not the final one, the CPU 202 starts feeding the next original and repeats the processing of Steps S110 to S118 (Step S121: N, Step 122). In a case where the read original is the final one (Step S121: Y), the CPU 202 discharges the final original to the discharge tray 117, then stops the original conveyance motor 205 to stop feeding the original, thus the job ends normally (Step S123).

In the reading mode of the specific original, the image reading apparatus 100 of the present embodiment as described above does not perform the streak image correction in the vicinity of the area where the content is printed on the original P. Therefore, the image reading apparatus 100 can erase unnecessary streak image as much as possible while suppressing the risk of erasure of content.

Second Embodiment

Since the configurations of the image reading apparatus 100 and the printer 200 of the image forming apparatus 1 of the second embodiment are substantially the same as those described in the first embodiment, the description thereof will be omitted. However, the configuration of the reading image processing unit 207 of the image reading apparatus 100 of the second embodiment is different from that of the first embodiment. The differences from the first embodiment will be described.

Figure 15:
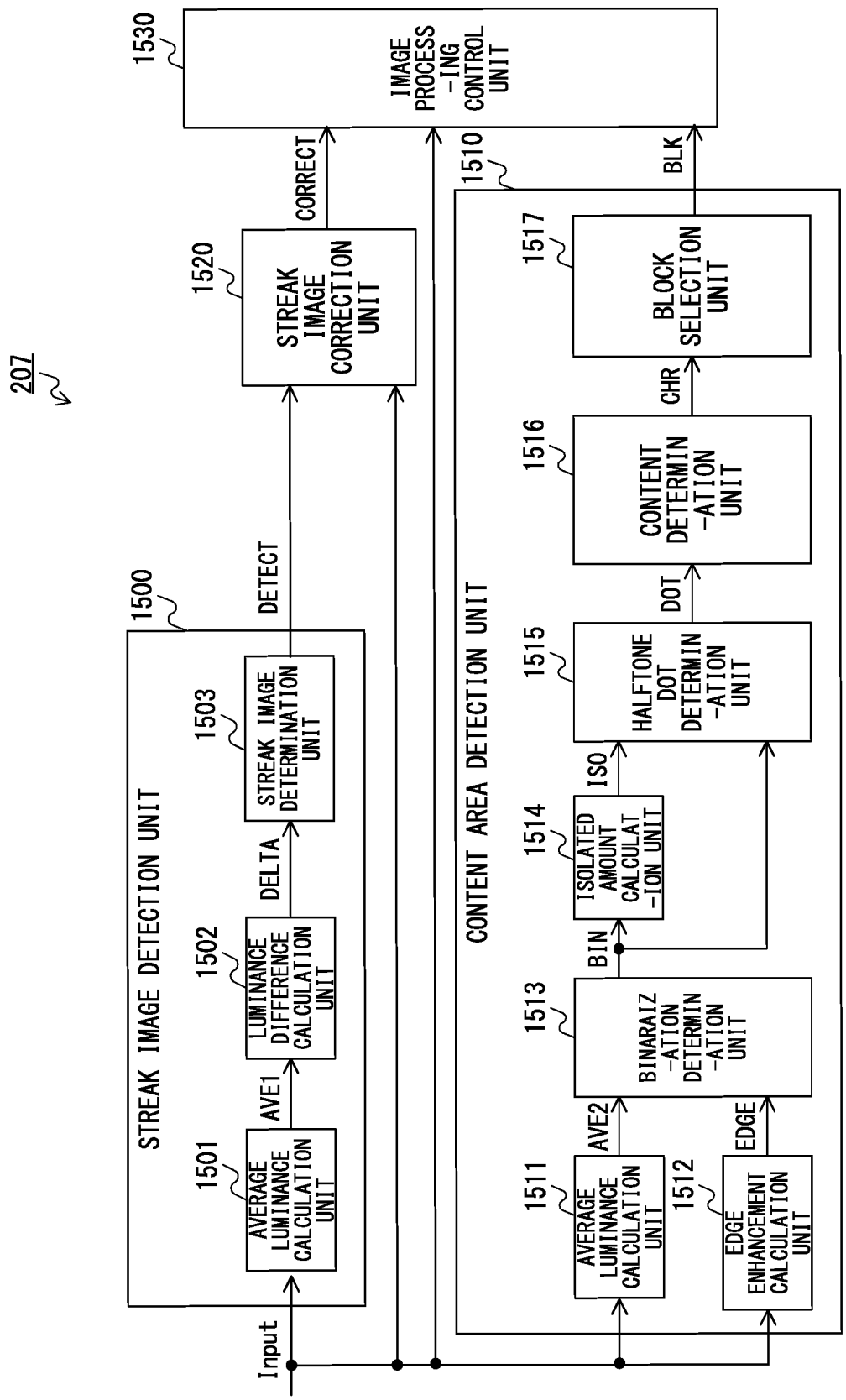
FIG. 15 is a configuration view of a reading image processing unit.

FIG. 15 is an explanatory view of a configuration of the reading image processing unit 207. The reading image processing unit 207 of the second embodiment has a different configuration from the reading image processing unit 207 of the first embodiment in that the streak image correction unit 1520 does not obtain the output from the content area detection unit 1510 while other configurations are the same.

In FIG. 15, the streak image correction unit 1520 does not obtain the output data BLK from the content area detection unit 1510, rather, it outputs the image data CORRECT after the streak image correction to the image processing control unit 1530. Since the content area is not specified in the image data CORRECT, the content is erased together with the streak image. The image data CORRECT after the streak image correction, the reading data before the streak image correction, and the output data BLK indicating the content area output from the content area detection unit 1510 are input to the image processing control unit 1530. The image processing control unit 1530 restores, by adding the image of the content area of the reading data before correction to the corrected reading data, the content which has been erased together with the streak image in the streak image correction to thereby generate image data. As a result, the streak image is erased while leaving the content.

Also in the second embodiment with the configuration described above, the image reading processing with the streak image correction is performed as in the first embodiment. Similar to the first embodiment, the image reading apparatus 100 of the second embodiment can also erase the unnecessary streak image as much as possible while suppressing the risk of erasure of content.

As described above, according to the first embodiment and the second embodiment, it is possible to appropriately correct the streak image, and it is possible to suppress the risk of the erasure of content and the deterioration of readability. The method of detecting the content area is not limited to the processing by the content area detection unit 410 described in the first embodiment and the second embodiment. For example, the content area may be detected for each predetermined pixel block by a machine-learned model such as deep learning. That is, for detecting the content area, a machine learning model which uses a large number of image data representing the content as teacher data may be used.

Further, in the reading mode for the specific original, for example, the user may specify an area (that is, a content area) in which the read image is displayed on the operation panel 201 and the streak image correction is not performed. The streak image correction unit 420 performs the streak image correction for an area not specified by the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-028650, filed Feb. 25, 2021, which is hereby incorporated by reference herein in its entirety.

What is claimed is:

1. An image reading apparatus, comprising:
a conveyance unit configured to convey an original;
an image reading unit configured to read an image of the original conveyed by the conveyance unit by using a reading sensor to generate image data which represents a reading result representing a result of reading the original by the image reading unit;
at least one processor configured to:
   detect a streak image in an image represented by the image data based on the image data;
   determine a content area in the image represented by the image data, the content area being an area where content is printed, and
   perform correction processing for removing the streak image by correcting the image data;
wherein the at least one processor is configured to be operable in a first reading mode in which:
   the correction processing is performed to image data corresponding to the streak image in an area outside the content area in the image represented by the image data; and
   the correction processing is not performed to image data corresponding to the streak image in the content area in the image represented by the image data.

2. The image reading apparatus according to claim 1, wherein the at least one processor is configured to be operable in a second reading mode in which the correction processing to image data corresponding to the streak image in the content area in the image represented by the image data regardless of presence or absence of the content area in the image represented by the image data.

3. The image reading apparatus according to claim 1, wherein the first reading mode is a reading mode to read a specific original.

4. The image reading apparatus according to claim 3, wherein the first reading mode is a reading mode to read an accounting document as the original.

5. The image reading apparatus according to claim 1,
wherein the image reading apparatus includes a white guide member arranged on at a position opposite to the image reading unit with respect to a conveyance path along which the original passes through, and
wherein the at least one processor is configured to detect the streak image in the image represented by the image data based on:
   an image data generated when the white guide member is read by the image reading unit; and
   an image data generated when the original is read by the image reading unit.

6. The image reading apparatus according to claim 1, wherein the at least one processor is configured to determine an image including the content and having a predetermined size as the content area.

7. The image reading apparatus according to claim 1, wherein the content area is an area in which an image is printed.

8. The image reading apparatus according to claim 1, wherein the content area is an area in which a character is printed.

9. The image reading apparatus according to claim 1, wherein the content area is an area specified by a user.

* * * * *